United States Patent
Dong et al.

(10) Patent No.: US 10,677,605 B2
(45) Date of Patent: Jun. 9, 2020

(54) SYSTEM AND METHOD FOR DETERMINING MOTOR VEHICLE COLLISON RISK BASED ON TRAVELED ROUTE AND DISPLAYING DETERMINED RISK AS A MAP

(71) Applicant: INTERNATIONAL BUSINESS MACHINES CORPORATION, Armonk, NY (US)

(72) Inventors: Wei Shan Dong, Beijing (CN); Ning Duan, Beijing (CN); Peng Gao, Beijing (CN); Kai Li, Beijing (CN); Zhi Hu Wang, Beijing (CN); Ting Yuan, Beijing (CN); Xin Zhang, Beijing (CN); Shi Wan Zhao, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 303 days.

(21) Appl. No.: 15/793,320

(22) Filed: Oct. 25, 2017

(65) Prior Publication Data
US 2019/0120641 A1   Apr. 25, 2019

(51) Int. Cl.
*G01C 21/34* (2006.01)
*G01C 21/36* (2006.01)
(Continued)

(52) U.S. Cl.
CPC ..... *G01C 21/3461* (2013.01); *G01C 21/3492* (2013.01); *G01C 21/3697* (2013.01);
(Continued)

(58) Field of Classification Search
CPC ............ G01C 21/3461; G01C 21/3492; G01C 21/3697; G01C 21/3667; G08G 1/096888; G06Q 40/08; B60W 2550/402
See application file for complete search history.

(56) References Cited

U.S. PATENT DOCUMENTS

| | | | |
|---|---|---|---|
| 8,606,512 B1 * | 12/2013 | Bogovich et al. | G01C 21/3461 701/423 |
| 2011/0213628 A1 * | 9/2011 | Peak et al. | G06Q 40/08 705/4 |

(Continued)

FOREIGN PATENT DOCUMENTS

EP   3013643 A2   5/2016

*Primary Examiner* — Dale W Hilgendorf
(74) *Attorney, Agent, or Firm* — F. Chau & Associates, LLC

(57) ABSTRACT

A system for tracking cumulative motor vehicle risk includes a satellite navigation system receiver disposed within a motor vehicle and configured to determine a present location of the motor vehicle. A computer processor receives the determined present location of the motor vehicle from the satellite navigation system receiver and generates a traveled route therefrom. A first computer server receives a plurality of motor vehicle claims records, determines a plurality of motor vehicle accident locations from the plurality of motor vehicle claims records, and generates a motor vehicle accident heat map from the plurality of motor vehicle accident locations. A second computer server determines a cumulative risk exposure of the motor vehicle based on the generated traveled route and the generated motor vehicle accident heat map.

11 Claims, 5 Drawing Sheets

(51) Int. Cl.
*G06Q 40/08* (2012.01)
*G08G 1/0968* (2006.01)

(52) U.S. Cl.
CPC ....... *G06Q 40/08* (2013.01); *G08G 1/096888* (2013.01); *G01C 21/3667* (2013.01)

(56) References Cited

U.S. PATENT DOCUMENTS

| | | | |
|---|---|---|---|
| 2012/0123806 A1* | 5/2012 | Schumann, Jr. et al. | G06Q 40/08 705/4 |
| 2016/0047666 A1* | 2/2016 | Fuchs | G01O 21/3461 701/423 |
| 2016/0167652 A1* | 6/2016 | Slusar | G06O 40/08 701/27 |
| 2016/0171521 A1* | 6/2016 | Ramirez et al. | G01C 21/3461 701/409 |
| 2016/0189303 A1 | 6/2016 | Fuchs | |
| 2016/0189306 A1 | 6/2016 | Bogovich et al. | |
| 2017/0292848 A1* | 10/2017 | Neponnuceno et al. | G01C 21/3461 |
| 2018/0340787 A1* | 11/2018 | Sheth et al. | G21C 21/3476 |

* cited by examiner

SYSTEM AND METHOD FOR DETERMINING MOTOR VEHICLE COLLISON RISK BASED ON TRAVELED ROUTE AND DISPLAYING DETERMINED RISK AS A MAP

BACKGROUND

The present invention relates to displaying motor vehicle collision risk and, more specifically, to systems and methods for determining motor vehicle collision risk based on traveled routes and displaying the motor vehicle collision risk, so determined, as a map.

Understanding motor vehicle risk can be useful for saving lives, reducing property damage, and establishing insurance rates. Conventional approaches for understanding motor vehicle collision risk focus mainly on driver demographics and personal driving record. Some modern approaches to understanding motor vehicle collision risk incorporate vehicle usage data, such as vehicle speed, miles driven, etc. Where this data is automatically reported by the vehicle's computer, the term "telematics" is often used. Some approaches for vehicle insurance that make use of telematics are referred to as usage-based insurance (UBI).

SUMMARY

A system for tracking cumulative motor vehicle risk includes a satellite navigation system receiver disposed within a motor vehicle and configured to determine a present location of the motor vehicle. A computer processor receives the determined present location of the motor vehicle from the satellite navigation system receiver and generates a traveled route therefrom. A first computer server receives a plurality of motor vehicle claims records, determines a plurality of motor vehicle accident locations from the plurality of motor vehicle claims records, and generates a motor vehicle accident heat map from the plurality of motor vehicle accident locations. A second computer server determines a cumulative risk exposure of the motor vehicle based on the generated traveled route and the generated motor vehicle accident heat map.

A system for providing route guidance based on calculated motor vehicle collision risk includes a satellite-based navigation system installed within a motor vehicle for determining a present location. A destination address is received. A plurality of route candidates for navigating between the present location and a destination address are determined. A central server receives a plurality of motor vehicle claims records, determining a plurality of motor vehicle accident locations from the plurality of motor vehicle claims records, and generates a motor vehicle accident heat map from the plurality of motor vehicle accident locations. A computer processor determines a cumulative risk exposure for each of the plurality of route candidates based on the generated motor vehicle accident heat map and selects a desired route from among the plurality of route candidates at least in part based on the determined cumulative risk exposure for each of the plurality of route candidates.

A method for tracking cumulative motor vehicle risk includes determining a present location of a motor vehicle. The determined present location of the motor vehicle is received and a traveled route is generated therefrom. A plurality of motor vehicle claims records is received. A plurality of motor vehicle accident locations is determined from the plurality of motor vehicle claims records. A motor vehicle accident heat map is generated from the plurality of motor vehicle accident locations. A cumulative risk exposure of the motor vehicle is determined based on the generated traveled route and the generated motor vehicle accident heat map.

BRIEF DESCRIPTION OF THE SEVERAL VIEWS OF THE DRAWINGS

A more complete appreciation of the present invention and many of the attendant aspects thereof will be readily obtained as the same becomes better understood by reference to the following detailed description when considered in connection with the accompanying drawings, wherein.

DETAILED DESCRIPTION

Figure 1:
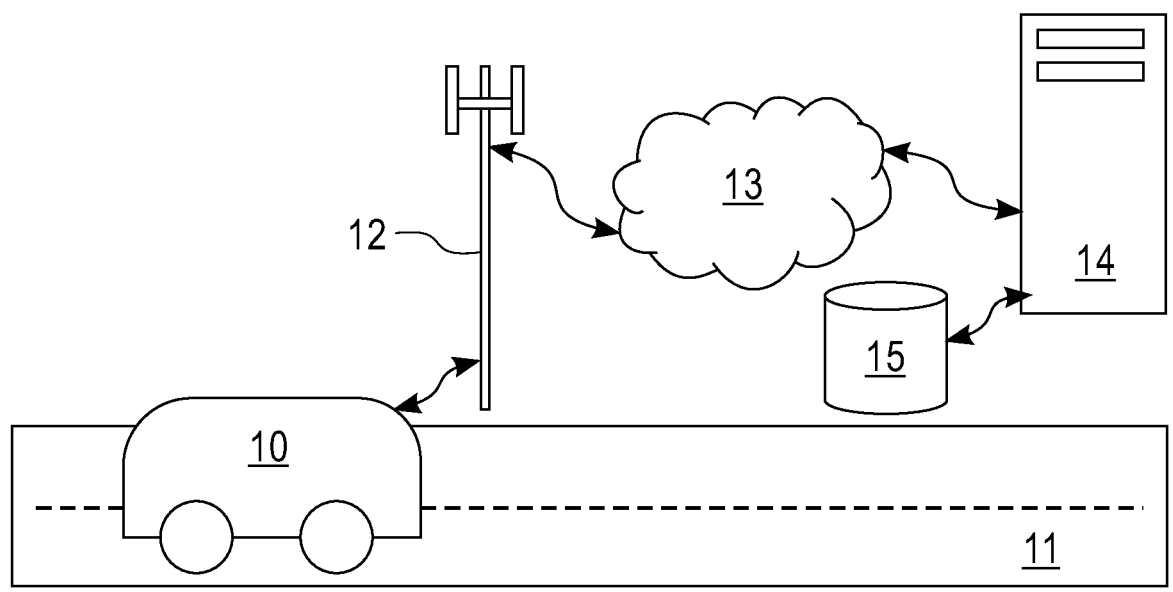
FIG. 1 is a schematic diagram illustrating a system for determining and displaying motor vehicle collision risk in accordance with exemplary embodiments of the present invention.

In describing exemplary embodiments of the present invention illustrated in the drawings, specific terminology is employed for sake of clarity. However, the present invention is not intended to be limited to the illustrations or any specific terminology, and it is to be understood that each element includes all equivalents.

Exemplary embodiments of the present invention relate to systems and methods for determining motor vehicle collision risk based on a driver's route history. According to this approach, insurance claims data and other records may be used to determine the location at which motor vehicle accidents tend to happen. These locations may then be plotted within map data so that inferences may be made as to the relative risk of each section of roadway within an area map. Then, the driver's location may be monitored and scored according to the relative risk of each section of roadway traveled by the driver. Thus, while conventional approaches may assess driver risk simply by a number of miles driven, exemplary embodiments of the present invention attribute a degree of risk to each mile driven so that risk may represented both in terms of how many miles were driven and what the risk was for each of those miles.

FIG. 1 is a schematic diagram illustrating a system for determining and displaying motor vehicle collision risk in accordance with exemplary embodiments of the present invention. As can be seen, a motor vehicle 10 may be driven down a section of roadway 11. The motor vehicle 10 may transmit its location to a central server 14, for example, by telematics. Accordingly, a cellular transponder disposed within the motor vehicle 10 may relay instantaneous location information that is based on a global positioning system (GPS) guidance device that is also disposed within the motor vehicle 10. The cellular transponder may interface with one or more cellular base stations 12 which may then transmit the information across a computer network 13, such as the Internet, to the central server. The central server may store the progression of instantaneous location information as traveled routes. The traveled routes may be stored within a database 15.

Figure 2:
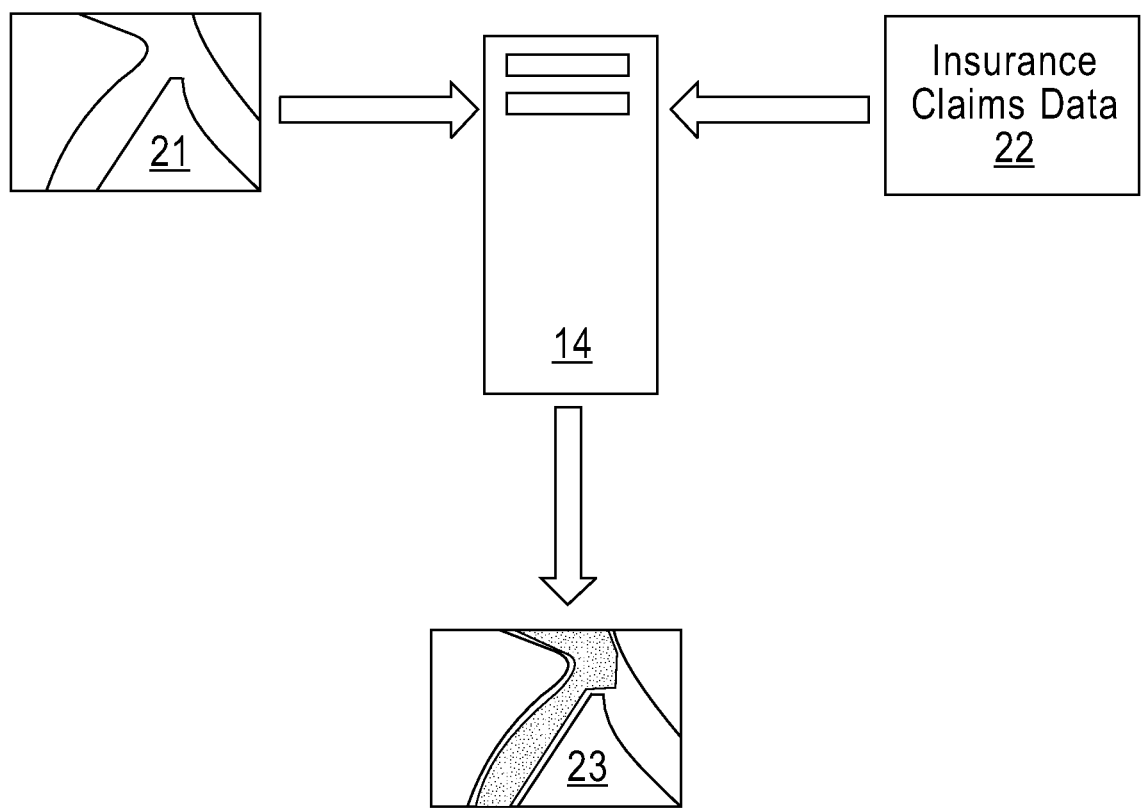
FIG. 2 is a schematic diagram illustrating a system for determining and displaying motor vehicle collision risk in accordance with exemplary embodiments of the present invention.

FIG. 2 is a schematic diagram illustrating a system for determining and displaying motor vehicle collision risk in accordance with exemplary embodiments of the present invention. As can be seen from this figure, the central server 14, which may be a same central server as previously described or may be a different central server, may receive insurance claims data 22. The insurance claims data 22 may include, among other data, locations at which accidents have occurred. Although not shown, the central server 14 may also receive other information that is indicative of the location of occurrence of motor vehicle accidents, such as by police reports, telematics from other motor vehicles as they are involved in such accidents, news reports, and the like.

The central server 14 may also receive map data 21 from a mapping service, such as GOGGLE MAPS, a mapping service provided by GOOGLE LLC. The map data 21 may correspond location information, such as addresses or coordinates with roadways. The central server 14 may disambiguate the locations of the accidents and then plot these locations within the map data 21. The result may be to generate a heat map, or some other graphic representation, that depicts the incidences of motor vehicle accidents upon a regional map 23. Even though the accident locations may be plotted as discrete points, the data points may be smoothed across the roadways to establish an accident risk associated with each segment of each roadway. The roadway may be segmented into sections of a fixed area or linear length. The smaller the segments, the more accurate the approach may be, however, where less data is available, the segments may be made larger. The heat map 23 may thereby represent a map of an area in which each roadway thereon is attributed a level of risk, that changes either by section, or continually.

Figure 3:
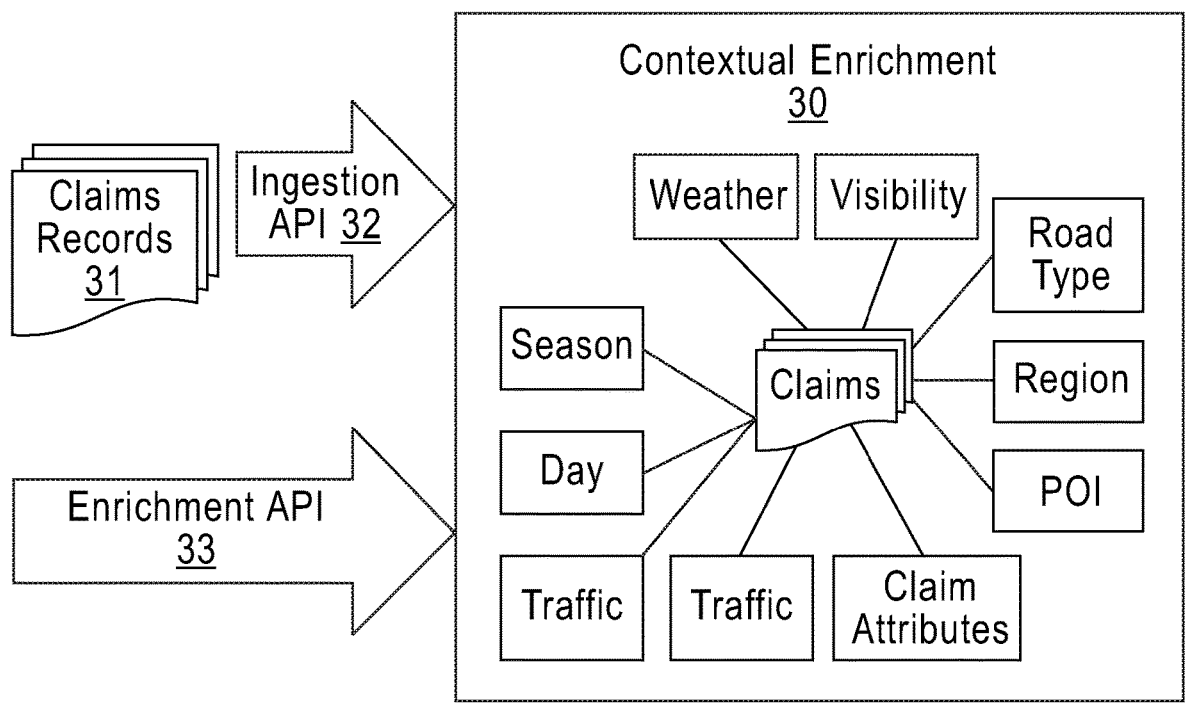
FIG. 3 is a graph illustrating an approach for analyzing the context of claims data in accordance with exemplary embodiments of the present invention.

However, it is to be noted that the insurance claims data 22, and other data sources, may contain additional information about the accidents that have occurred and this additional information may be taken to mitigate or amplify the effects of each accident upon the heat map 23 on the understanding that certain factors besides the roadway itself may have a bearing on accident prevalence, such as, for example, bad weather conditions. Thus, an accident that occurred in low visibility conditions may be less attributable to the roadway location than an accident that occurred in good visibility conditions. However, as certain roadways may be more prone to accidents under low visibility conditions than other roadways under identical conditions, these "contextual enrichments" may be used to help understand the deeper significance of motor vehicle accidents and to what extent the roadway itself may have contributed to each accident. FIG. 3 is a graph illustrating an approach for analyzing the context of claims data in accordance with exemplary embodiments of the present invention. A contextual enrichment engine 30 may be used to analyze claims data in light of contextual enrichments such as weather, visibility, roadway type, region, nearby points of interest (POI), season, day, time period, traffic condition, and/or other claim attributes.

The contextual enrichment engine 30 may be instantiated within the central server, or another server, for example, by interfacing with an enrichment API 33. The claims records 31 may be provided to the contextual enrichment engine 30 via an ingestion API 32.

Figure 4:
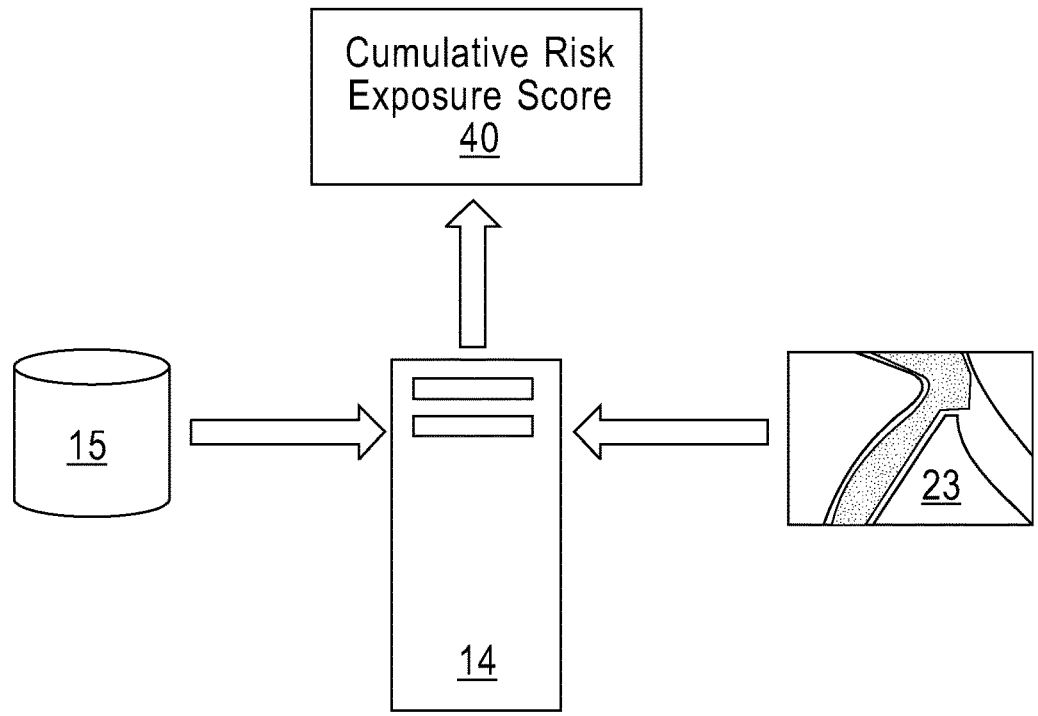
FIG. 4 is a diagram illustrating a system for calculating cumulative risk exposure in accordance with exemplary embodiments of the present invention.

FIG. 4 is a diagram illustrating a system for calculating cumulative risk exposure in accordance with exemplary embodiments of the present invention. The central server 14, may use the heat map 23 as well as the route data stored within the database 15 to assess a cumulative level of risk 40. This may be performed, for example, by plotting the route data against the heat map 23 to see how much time and/or distance was spent at what risk levels. By integrating the route over the heat map, with respect to time or distance, or by stepping through the route section-by-section, and adding up a level of risk at each section, a cumulative risk exposure may be scored 40.

This cumulative risk score may have many uses. For example, the score may be used in usage-based insurance (UBI) to calculate a driver's level of risk according to the routes taken. Also, this method may be used to assess the relative risk of multiple route candidates and then to select from among the multiple route candidates, at least in part, based on minimizing the cumulative risk exposure.

For example, a route for an autonomous vehicle may be calculated, at least in part, by minimizing cumulative risk exposure calculated according to the approach discussed above. For example, a satellite navigation guidance system installed within the motor vehicle may select a desired route based, at least in part, on minimizing cumulative risk exposure, even though it is understood that other factors such as trip time and distance traveled would be factored in as well.

According to one exemplary embodiment of the present invention, a user may be provided with a set of routes that can be taken to get from one point to another, and a cumulative risk exposure score may be displayed along with each route. The user may then be incentivized to select the route of minimum cumulative risk exposure by offering the user reductions on insurance premiums, or the like.

As discussed above, the accident locations of the claims data may be disambiguated. This may include determining, for each accident, specific coordinate at which the accident occurred, or other unambiguous designation of location, from the data that may be provided in the insurance claim, which may specify a spatial relationship with respect to an address or point of interest, such as "in front of the bank" or "next to 33 Applewood Drive." This process may be complicated by the fact that addresses are not always described the same way, the same address may go by multiple different names, and/or different addresses may have very similar names. Thus, the step of disambiguation resolves the location information given for each motor vehicle accident into an unambiguous designation of location.

Figure 5:
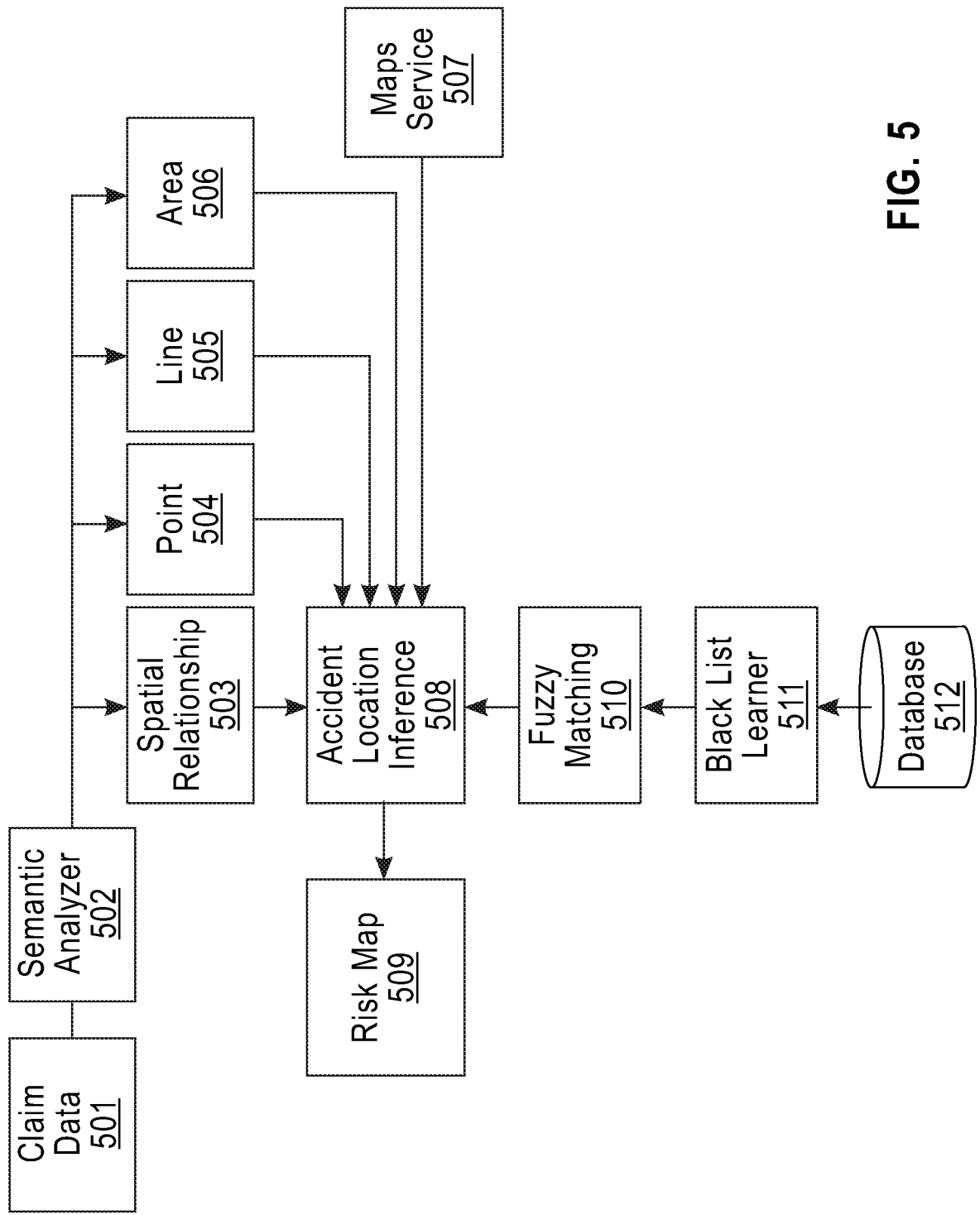
FIG. 5 is a chart illustrating an approach for address disambiguation in accordance with exemplary embodiments of the present invention.

FIG. 5 is a chart illustrating an approach for address disambiguation in accordance with exemplary embodiments of the present invention. The claim data 501 may be sent to a semantic analyzer 502. The semantic analyzer 502 may analyze the locations of the accidents, as described within the claim data 501, by such factors as spatial relationship 503, point of interest 504, a line of roadway 505, and/or an area of roadway 506. This information may then be sent to an accident location interface 508, which may disambiguate the location information, for example, based on the above data, and may then plot the accident locations upon map data received from a map service 507 to produce the risk map/heat map 509.

In performing disambiguation, accident location is often represented within the claims data in terms of spatial relationship to a building or point of interest. For example, a location may be written as, "Close to GM Building" or "Opposite to GM Building," Other spatial relationships may be "East of GM Building," "100 m east of GM Building," etc. In these instances, it may be difficult to pinpoint the given location using a map service such as GOOGLE MAPS, a mapping service provided by GOOGLE LLC. Accordingly, disambiguation may include resolving a stated location based on a spatial relationship to a point of interest. This may be done by first identifying the location information as a point of interest+spatial relationship, then finding the point of interest within the map service, and then offsetting the location by the stated spatial relationship. Some spatial relationships may be explicit, such as "100 m south of GM Building" but other spatial relationships may be less clear such as "close to GM Building." Where the spatial relationship less certain, exemplary embodiments of the present invention may analyze the map data to infer a precise location, for example, by inferring that the accident takes place on a roadway and then identifying a roadway and location that would most likely satisfy the given spatial relationship. For example, "close to GM building" may be inferred as occurring on a roadway passing by the GM building, Where available, additional descriptions of the location may be used to narrow down the exact cite of the accident, for example, where first location information is "close to GM building" and second location information is "next to parking structure" the map data may be analyzed to fine a location where both descriptions are satisfied. In this way, two or more location indicators may be resolved to infer a singular location, based on point of interest+spatial relationship. For example, "close to GM building" may be inferred as occurring on a roadway passing by the GM building. Where available, additional descriptions of the location may be used to narrow down the exact cite of the accident, for example, where first location information is "close to GM building" and second location information is "next to parking structure" the map data may be analyzed to fine a location where both descriptions are satisfied. In this way, two or more location indicators may be resolved to infer a singular location, based on point of interest+spatial relationship.

In performing this function, the accident location interface 508 may utilize a database of street names, point of interest locations, known spatial relationships, known address similarities/differences, etc. 512 to perform black list learning, using a black list learner 511, and fuzzy matching using a fuzzy matcher 510.

In fuzzy matching, it is understood that some street names may contain errors that make exact matching against known street names from the mapping service impossible. For example, "Oak Drive" may be referred to as "Oak Street." Also, out of date street names may be used in place of current street names. Thus, fuzzy matching tries to assess a level of similarity between a location derived from the claim data and a location of the map service data, and then, when there is a close enough match made, the address may be successfully inferred. For example, "Oak Drive" may strongly match with "Oak Street" even though the match is not exact.

However, it is further understood that in some occasions, multiple street names may strongly match, but are known to represent different locations. For example, in a town where there is both a "6$^{th}$ Ave" and a "6$^{th}$ Street" the address "101 6$^{th}$", should not be matched against "6$^{th}$ Ave" over "6$^{th}$ Street" regardless of the level of match. In these cases, the instant approach might identify "6$^{th}$" as part of a black list for which fuzzy matching should not be used alone, and in these cases, exception patterns may be understood. Thus, other location clues may be used to determine the appropriate street, rather than relying solely upon the fuzzy matching.

In performing fuzzy matching of roadway names, road names may be matched, for example, using longest common substring (LCS). A black list may be used to identify various patterns in regular expressions that are known not to correspond to identical locations, and a penalty may be imposed based on a black list match. There may also be a white list in which two names that might not share a long substring, or any substring, are known to be identical, and a reward may be applied to a white list match. The penalties and rewards may then be used, along with the LCS results, to calculate similarity and to decide on a match or non-match based on these similarity scores.

Figure 6:
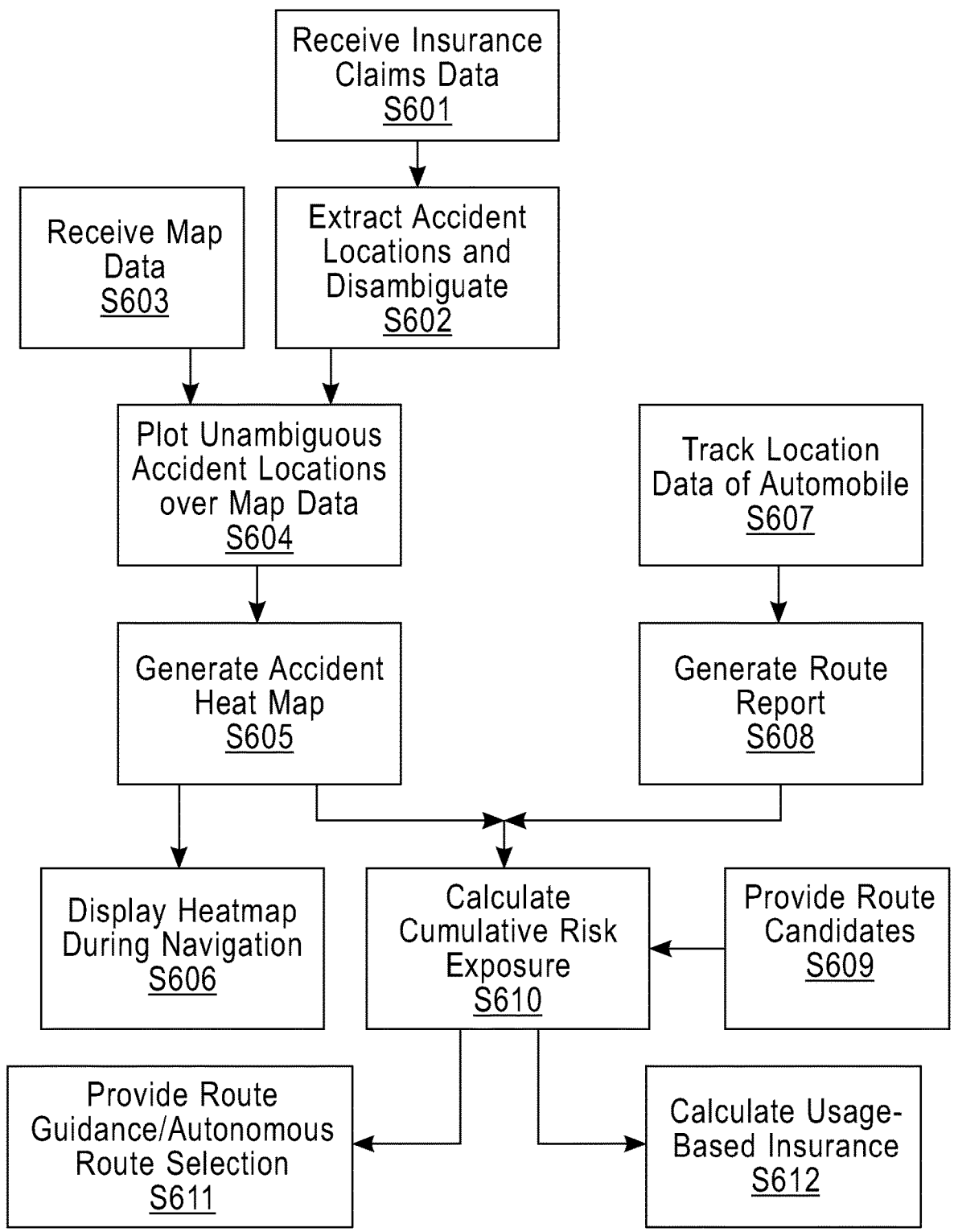
FIG. 6 is a flow chart illustrating an approach for determining and utilizing motor vehicle risk in accordance with exemplary embodiments of the present invention.

FIG. 6 is a flow chart illustrating an approach for determining and utilizing motor vehicle risk in accordance with exemplary embodiments of the present invention. As described above, insurance claims data may be received (Step S601). Then, accident locations may be extracted from the insurance claims data and the accident locations may be disambiguated (Step S602). Map data may also be received (Step S603), for example, from a mapping service. Using the map data and the disambiguated location information, accident locations may be plotted (Step S604). By weighing the accident locations according to contextual enhancements and by interpolating the plotted points, an accident heat map may be constructed (Step S605). This accident heat map may be displayed, for example, to a driver while driving, as part of an in-dash or heads-up display (Step S606).

The location of one or more motor vehicles may also be tracked (Step S607) and this information may be used to generate a route report for each tracked vehicle (Step S608).

In the case where routes are to be compared, a set of route candidates may be provided (Step S609).

A cumulative risk exposure may be calculated for each route report and/or route candidate (Step S610). From the calculated risk exposure, route guidance may be provided and/or autonomous route selection may be performed (Step S611). Usage-based insurance may also be calculated, at least in part, based on the calculated cumulative risk of the automobile route repots (Step S612).

Figure 7:
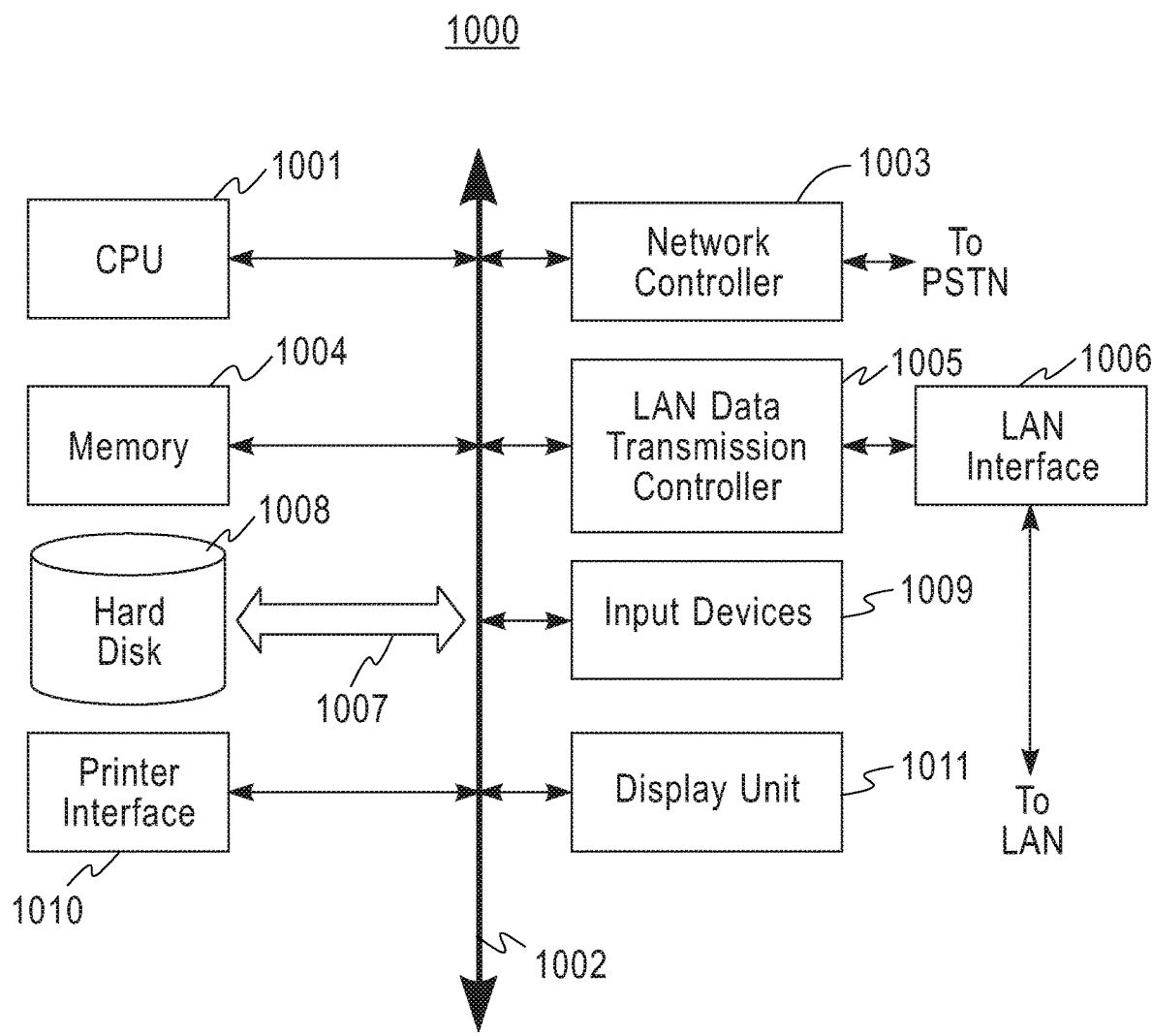
FIG. 7 shows an example of a computer system capable of implementing the method and apparatus according to embodiments of the present disclosure.

FIG. 7 shows another example of a system in accordance with some embodiments of the present invention. By way of overview, some embodiments of the present invention may be implemented in the form of a software application running on one or more (e.g., a "cloud" of) computer system(s), for example, mainframe(s), personal computer(s) (PC), handheld computer(s), client(s), server(s), peer devices, etc. The software application may be implemented as computer readable/executable instructions stored on a computer readable storage media (discussed in more detail below) that is locally accessible by the computer system and/or remotely accessible via a hard wired or wireless connection to a network, for example, a local area network, or the Internet.

Referring now to FIG. 7, a computer system (referred to generally as system 1000) may include, for example, a processor e.g., central processing unit (CPU) 1001, memory 1004 such as a random access memory (RAM), a printer interface 1010, a display unit 1011, a local area network (LAN) data transmission controller 1005, which is operably coupled to a LAN interface 1006 which can be further coupled to a LAN, a network controller 1003 that may provide for communication with a Public Switched Telephone Network (PSTN), one or more input devices 1009, for example, a keyboard, mouse etc., and a bus 1002 for operably connecting various subsystems/components. As shown, the system 1000 may also be connected via a link 1007 to a non-volatile data store, for example, hard disk, 1008.

In some embodiments, a software application is stored in memory 1004 that when executed by CPU 1001, causes the system to perform a computer-implemented method in accordance with some embodiments of the present invention, e.g., one or more features of the methods, described with reference to FIG. 6.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Exemplary embodiments described herein are illustrative, and many variations can be introduced without departing from the spirit of the invention or from the scope of the appended claims. For example, elements and/or features of different exemplary embodiments may be combined with each other and/or substituted for each other within the scope of this invention and appended claims.

What is claimed is:

1. A system for tracking cumulative motor vehicle risk, comprising:
   a satellite navigation system receiver disposed within a motor vehicle and configured to determine a present location of the motor vehicle;
   a computer processor for receiving the determined present location of the motor vehicle from the satellite navigation system receiver and generating a traveled route therefrom;
   a first computer server for receiving a plurality of motor vehicle claims records, determining a plurality of motor vehicle accident locations from the plurality of motor vehicle claims records, and generating a motor vehicle accident heat map from the plurality of motor vehicle accident locations; and
   a second computer server for determining a cumulative risk exposure of the motor vehicle based on the generated traveled route and the generated motor vehicle accident heat map,
   wherein the first computer server additionally receives map data from a mapping service and uses the received map data to generate the motor vehicle accident heat map by plotting the plurality of motor vehicle accident locations onto the received map data,
   wherein the first computer server additionally disambiguates the plurality of motor vehicle accident locations from the plurality of motor vehicle claims records,
   wherein disambiguating the motor vehicle accident locations from the plurality of motor vehicle claims records includes performing fuzzy matching on location names within the motor vehicle accident locations from the plurality of motor vehicle claims records to corresponding locations within the map data, and
   wherein in performing fuzzy matching, a while list is considered to reward location names that do not share common string sequences but are known to correspond.

2. The system of claim 1, wherein the determined cumulative risk exposure is used to provide usage-based insurance.

3. The system of claim 1, wherein disambiguating the motor vehicle accident location from the plurality of motor vehicle claims records includes resolving a point of interest plus a spatial relationship with a unique location.

4. The system of claim 1, wherein disambiguating the motor vehicle accident location from the plurality of motor vehicle claims records includes resolving two location descriptors to a single unique location.

5. The system of claim 1, wherein in performing fuzzy matching, a black list is considered to penalize location names that share common string sequences but are known to be distinct.

6. The system of claim 1, further including a display device to display the cumulative risk exposure of the motor vehicle.

7. The system of claim 6, wherein the display device is mounted within the motor vehicle.

8. A system for providing route guidance based on calculated motor vehicle collision risk, comprising:
   a satellite-based navigation system installed within a motor vehicle for determining a present location, receiving a destination address, and determining a plurality of route candidates for navigating between the present location and the destination address;
   a central server for receiving a plurality of motor vehicle claims records, determining a plurality of motor vehicle accident locations from the plurality of motor vehicle claims records, and generating a motor vehicle accident heat map from the plurality of motor vehicle accident locations; and
   a computer processor for determining a cumulative risk exposure for each of the plurality of route candidates based on the generated motor vehicle accident heat map and for selecting a desired route from among the plurality of route candidates at least in part based on the determined cumulative risk exposure for each of the plurality of route candidates,
   wherein the generating of the motor vehicle accident heat map from the plurality of motor vehicle accident locations includes using map data received from a mapping service and using the received map data to generate the motor vehicle accident heat map by plotting the plurality of motor vehicle accident locations onto the received map data,
   wherein the computer processor additionally disambiguates the plurality of motor vehicle accident locations from the plurality of motor vehicle claims records,
   wherein disambiguating the motor vehicle accident locations from the plurality of motor vehicle claims records includes performing fuzzy matching on location names within the motor vehicle accident locations from the plurality of motor vehicle claims records to corresponding locations within the map data, and
   wherein in performing fuzzy matching, a black list is considered to penalize location B names that share common string sequences but are known to be distinct.

9. The system of claim 8, further comprising, an autonomous vehicle control system for driving the motor vehicle along the selected desired route.

10. The system of claim 8, wherein in performing fuzzy matching, a white list is considered to reward location names that do not share common string sequences but are known to correspond.

11. A method for tracking cumulative motor vehicle risk, comprising:
   determining a present location of a motor vehicle;
   receiving the determined present location of the motor vehicle and generating a traveled route therefrom;
   receiving a plurality of motor vehicle claims records;
   determining a plurality of motor vehicle accident locations from the plurality of motor vehicle claims records;
   generating a motor vehicle accident heat map from the plurality of motor vehicle accident locations; and determining a cumulative risk exposure of the motor vehicle based on the generated traveled route and the generated motor vehicle accident heat map, wherein map data is used to generate the motor vehicle accident heat map by plotting the plurality of motor vehicle accident locations onto the received map data, wherein the plurality of motor vehicle accident locations is disambiguated from the plurality of motor vehicle claims records, wherein disambiguating the motor vehicle accident locations from the plurality of motor vehicle claims records includes performing fuzzy matching on location names within the motor vehicle accident locations from the plurality of motor vehicle claims records to corresponding locations within the map data, and wherein in performing fuzzy matching, a white list is considered to reward location names that do not share common string sequences but are known to correspond and/or a black list is considered to penalize location names that share common string sequences but are known to be distinct.

* * * * *